United States Patent [19]

Kunishima et al.

[11] Patent Number: 5,048,887
[45] Date of Patent: Sep. 17, 1991

[54] SEALING ARRANGEMENT FOR VEHICLE BODY CLOSURE STRUCTURES

[75] Inventors: Tetuo Kunishima; Minoru Ueda; Takashi Nishigami, all of Hiroshima, Japan

[73] Assignee: Mazda Motor Corporation, Hiroshima, Japan

[21] Appl. No.: 584,573

[22] Filed: Sep. 18, 1990

[30] Foreign Application Priority Data

Sep. 29, 1989 [JP] Japan .................. 1-251879

[51] Int. Cl.⁵ .............................. B60J 10/08
[52] U.S. Cl. .................. 296/146; 296/203; 49/485
[58] Field of Search ........... 296/202, 203, 146, 908; 49/485

[56] References Cited

U.S. PATENT DOCUMENTS 4,549,761 10/1985 Lee et al. .................. 296/146 X
4,969,295 11/1990 Nishikawa et al. ......... 296/146 X

FOREIGN PATENT DOCUMENTS 61-120611 7/1986 Japan .

Primary Examiner—Margaret A. Focarino
Assistant Examiner—Gary C. Hoge
Attorney, Agent, or Firm—Wenderoth, Lind & Ponack

[57] ABSTRACT

An automotive vehicle body has a body opening defined by body structural members and a closure structure mounted on one of the body structural members for swinging movement between closed and opened positions. A sealing arrangement for the closure structure includes a corner bracket structure formed at a front upper portion of the closure structure, a reinforcement formed on one of the body structural members at a front upper portion of the body opening, and a continuous sealing member securely attached to the body structural members and a lower edge of the reinforcement. When the closure structure is in a closed position, the sealing member is in abutment with an inwardly facing surface of a sash member of the closure structure at the location above the corner bracket structure and gradually departs from the sash member in a rearward direction of the vehicle body at the location of the corner bracket structure.

5 Claims, 5 Drawing Sheets

SEALING ARRANGEMENT FOR VEHICLE BODY CLOSURE STRUCTURES

BACKGROUND OF THE INVENTION

1. Field of the Invention

The present invention generally relates to a vehicle body structure, and more particularly, to a sealing arrangement for closure structures of automotive vehicle bodies.

2. Description of the Prior Art

Conventionally, a front door structure of an automotive vehicle body consists of an upper half portion including a door sash having an inclined front edge and a lower half portion fabricated of door inner and outer panels. Japanese Utility Model Laid-open Application (unexamined) No. 61-120611 discloses one example of a front door structure.

The front door is mounted in a body opening having the same configuration as that of the front door and is adapted for swinging movement between opened and closed positions. The body opening is encompassed by body structural members each consisting of inner and outer panels having a pinch weld flange to which a seaming welt having a sealing member is securely attached. When the front door is in a closed position, the sealing member is in abutment with an inwardly facing surface thereof to provide a seal against dirt, dust and water.

In this kind of sealing arrangement, the sealing member disposed along the rear edge of a front pillar makes contact with the periphery of the front door. In other words, the former is in abutment with an inwardly facing surface of the door sash and the peripheral edge of an inwardly facing surface of the door panel continues with the door sash, when the front door is in a closed position.

Accordingly, the sealing member is not allowed to be formed in a configuration greatly different from the external shape of the front door, thus limiting the shape of the front pillar. This fact results in the difficulty in rigidifying the front pillar.

If a reinforcement is so provided as to extend downwardly from the front pillar at a front upper portion of the body opening, the sealing member inevitably departs from the door sash, thus lowering the sealing properties. Furthermore, if the reinforcement is sufficiently enlarged to raise the rigidity of the front pillar, there arises the problem that the sealing properties would be further lowered.

SUMMARY OF THE INVENTION

Accordingly, the present invention has been developed to substantially eliminate the above-described disadvantages inherent in the prior art sealing arrangement for vehicle body structures, and an object of the present invention is to provide an improved sealing arrangement capable of enhancing the sealing properties required to seal an opening between a closure structure and vehicle body structural members.

Another important object of the present invention is to provide a sealing arrangement of the above-described type which is capable of raising the rigidity of a base of a front pillar constituting the vehicle body structural members.

A further object of the present invention is to provide a sealing arrangement which contributes to the good appearance of the vehicle body.

In accomplishing these and other objects, a sealing arrangement according to the present invention includes a corner bracket structure formed at a front upper portion of a closure structure, a reinforcement formed on one of body structural members encompassing a body opening at a front upper portion of the body opening, and a continuous sealing means securely attached to the body structural members and a lower edge of the reinforcement. When the closure structure is in a closed position, the sealing means is in abutment with an inwardly facing surface of a sash member of the closure structure at the location above the corner bracket structure and gradually departs from contact with the sash member in a rearward direction of the vehicle body at the location of the corner bracket structure.

The sealing means spaced from the sash member sealingly engages with a trim member, which decoratively trims an inwardly facing surface of the corner bracket structure.

BRIEF DESCRIPTION OF THE DRAWINGS

The above and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 1:
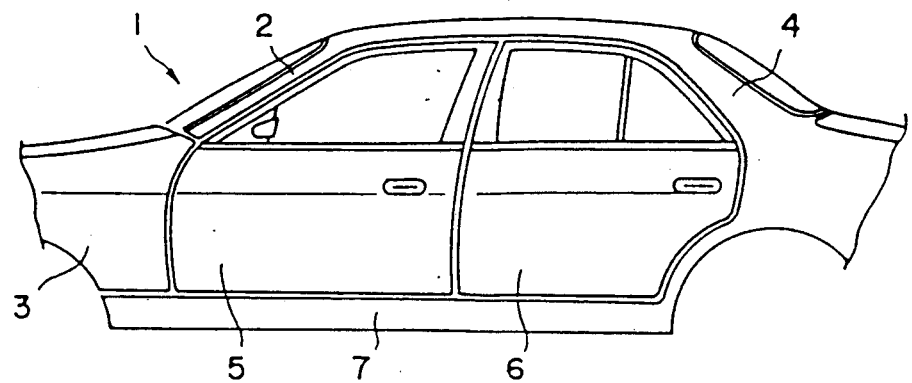
FIG. 1 is a fragmentary side elevational view of an automotive vehicle body to which the present invention is applied.

Referring now to the drawings, especially FIG. 1, there can be seen a partial side view of an automotive vehicle including a vehicle body 1 having a front pillar 2, a front fender 3, a rear pillar 4, a front door 5, a rear door 6, and a side sill 7. FIG. 1 depicts the left side of an automotive vehicle.

Figure 2:
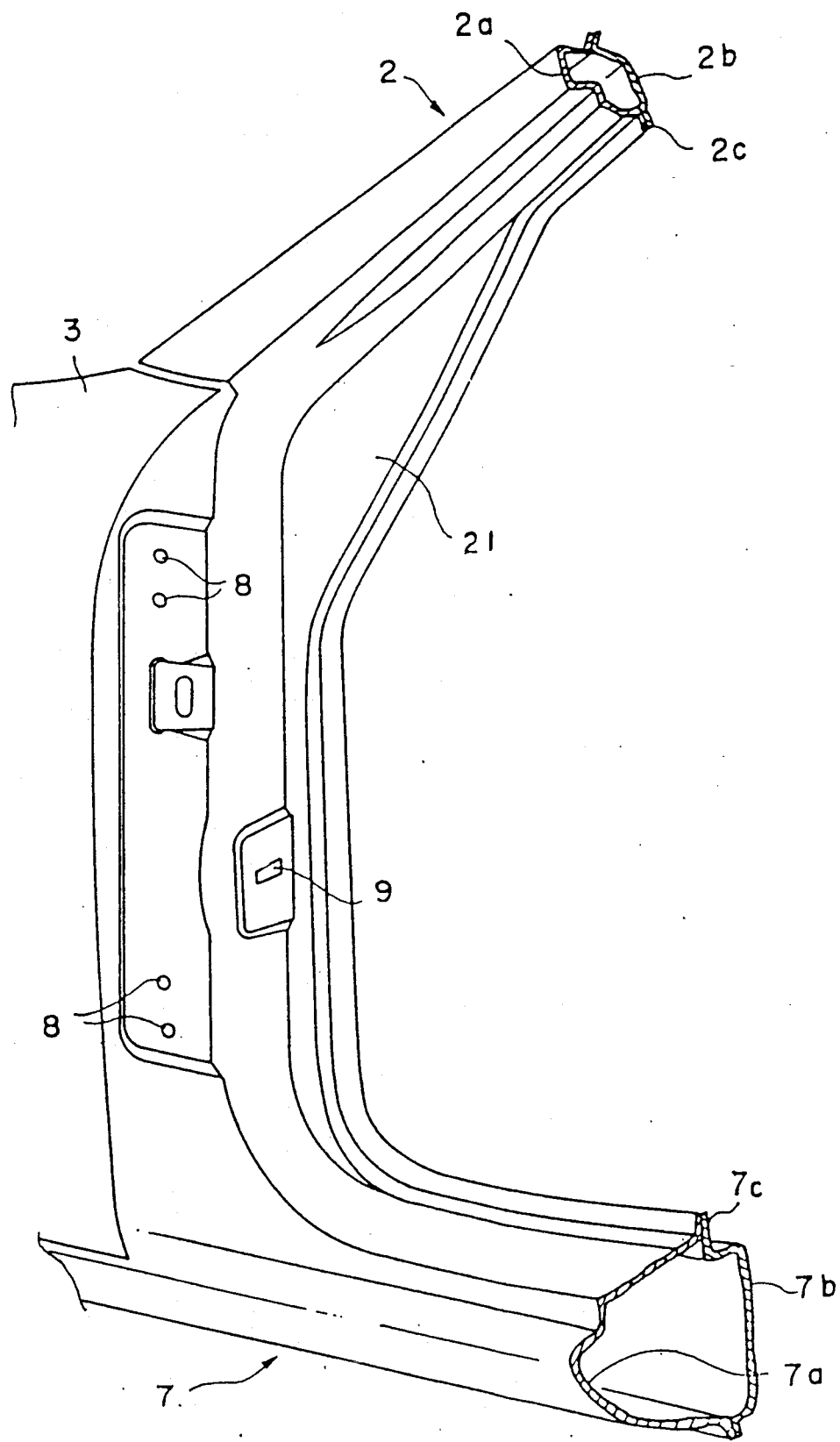
FIG. 2 is a fragmentary perspective view, on an enlarged scale, of a portion of the vehicle body on which a front door is hingedly mounted.

As shown in FIG. 2, the front pillar 2 has a closed section formed by a front pillar outer panel 2a and a front pillar inner panel 2b welded to each other. The lower end of the front pillar 2 is continued to the side sill 7 fabricated of a side sill outer panel 7a and a side sill inner panel 7b welded to each other.

The front pillar 2 is provided with a pinch weld flange 2c formed along the front edge of a body opening and continued to a pinch weld flange 7c of the side sill 7.

A reinforcement 21 substantially in the form of a triangle is formed on the front pillar 2 in the vicinity of an upper rear edge of the front fender 3 and extends toward the body opening. A plurality of openings 8 for receiving hinges of the front door 5 and an opening 9 for receiving a door checker are formed below the reinforcement 21 and outwardly of the flange 2c of the front pillar 2.

Figure 3:
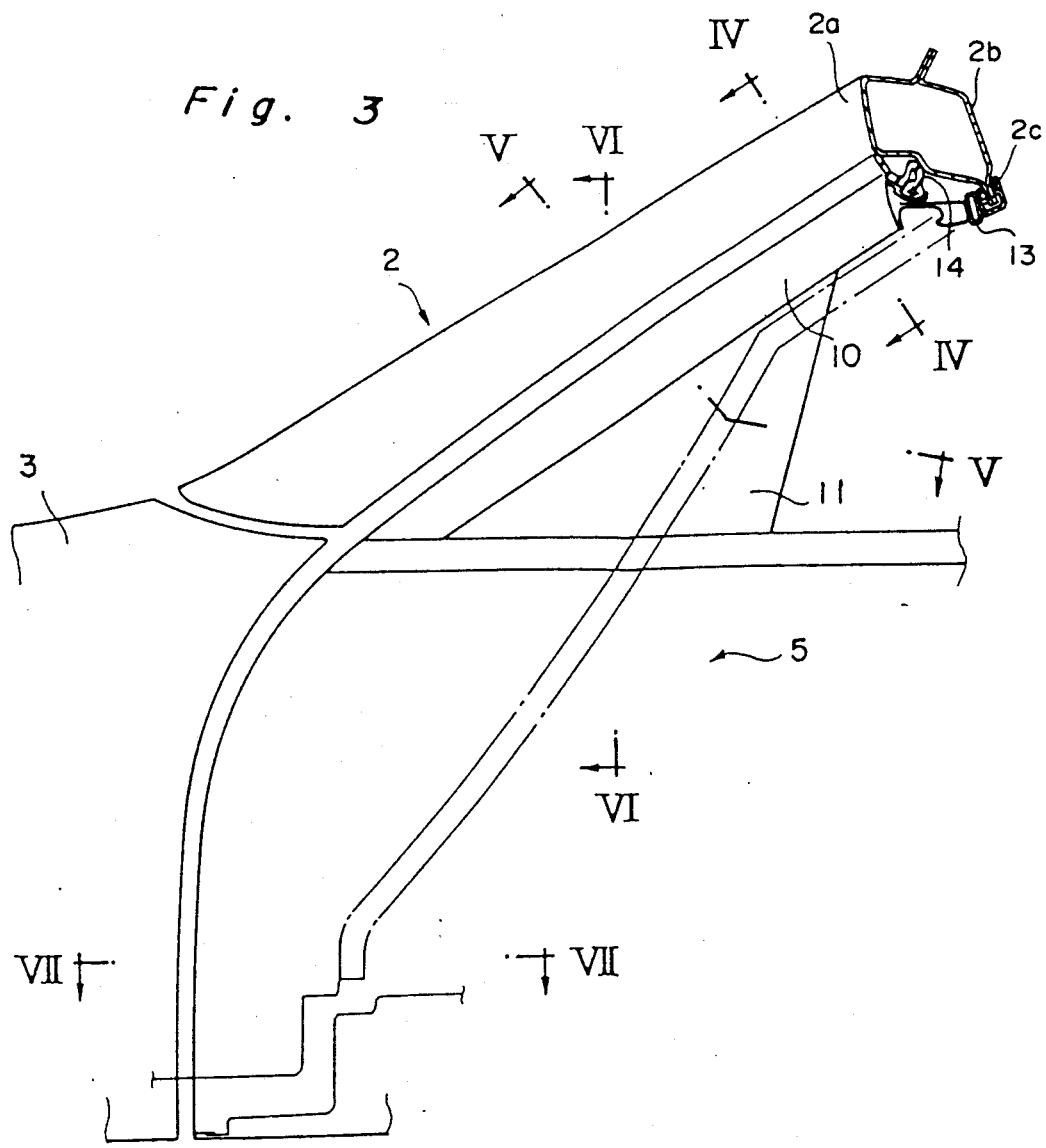
FIG. 3 is a fragmentary perspective view, on an enlarged scale, of a front pillar and the front side of the front door.

The front door 5 is provided at its upper portion with a door sash 10, as best shown in FIG. 3. A corner bracket 11 is formed at a corner of a joining area between the front lower end of the door sash 10 and a door panel constituting the front door 5.

The flange 2c of the front pillar 2 is covered with a seaming welt 12 (FIG. 4) to which a seal lip 13 (sealing member) is securely attached. When the front door 5 is in a closed position, this seal lip 13 sealingly engages with an inwardly facing surface thereof. More specifically, as shown in FIG. 3, the seal lip 13 is in abutment with the door sash 10 at the location above the corner bracket 11 and gradually rearwardly departs from the door sash 10 at the location of the corner bracket 11.

A door weather strip 14 is securely housed in a gutter formed inside the door sash 10 and is in abutment with a front pillar outer panel 2a when the front door 5 is in a closed position.

The sealing conditions achieved by the seal lip 13 is discussed in detail hereinafter with reference to FIGS. 4 to 7.

Figure 4:
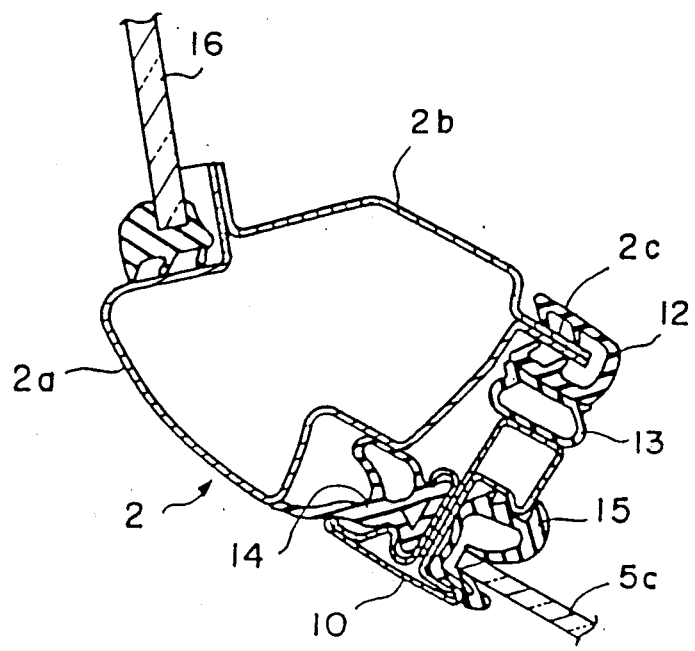
FIG. 4 is a sectional view taken along line IV—IV in FIG. 3.

As shown in FIG. 4, the seal lip 13 attached to the seaming welt 12 is in abutment with an inwardly facing surface of the door sash 10 at the location above the corner bracket 11 to seal the body opening.

The front door 5 is provided with a side window 5c, which is slidably mounted in a run channel 15 securely attached to the inside of the door sash 10. A windshield 16 is securely mounted on the front pillar outer panel 2a via a weather strip.

Figure 5:
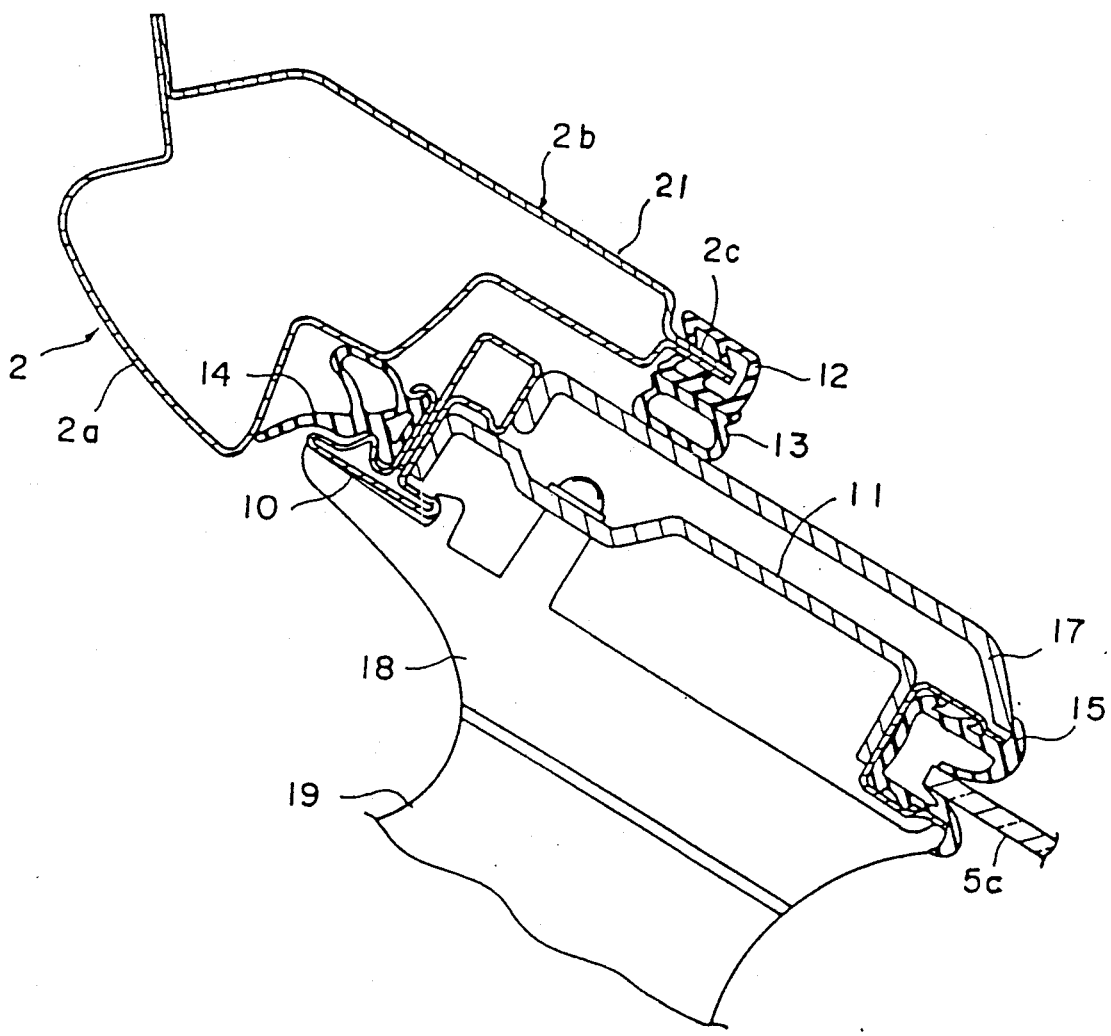
FIG. 5 is a sectional view taken along line V—V in FIG. 3.

At the location of the corner bracket 11, the reinforcement 21 of the front pillar 2 extends rearwardly toward the body opening, as shown in FIG. 5. Accordingly, the seal lip 13 gradually departs from an inwardly facing surface of the door sash 10 in a rearward direction of the vehicle body and makes contact with an inwardly facing surface of a trim member 17, which decoratively trims an inwardly facing surface of the corner bracket 11.

A door mirror 19 is securely mounted on the corner bracket 11 via a mirror base 18.

Figure 6:
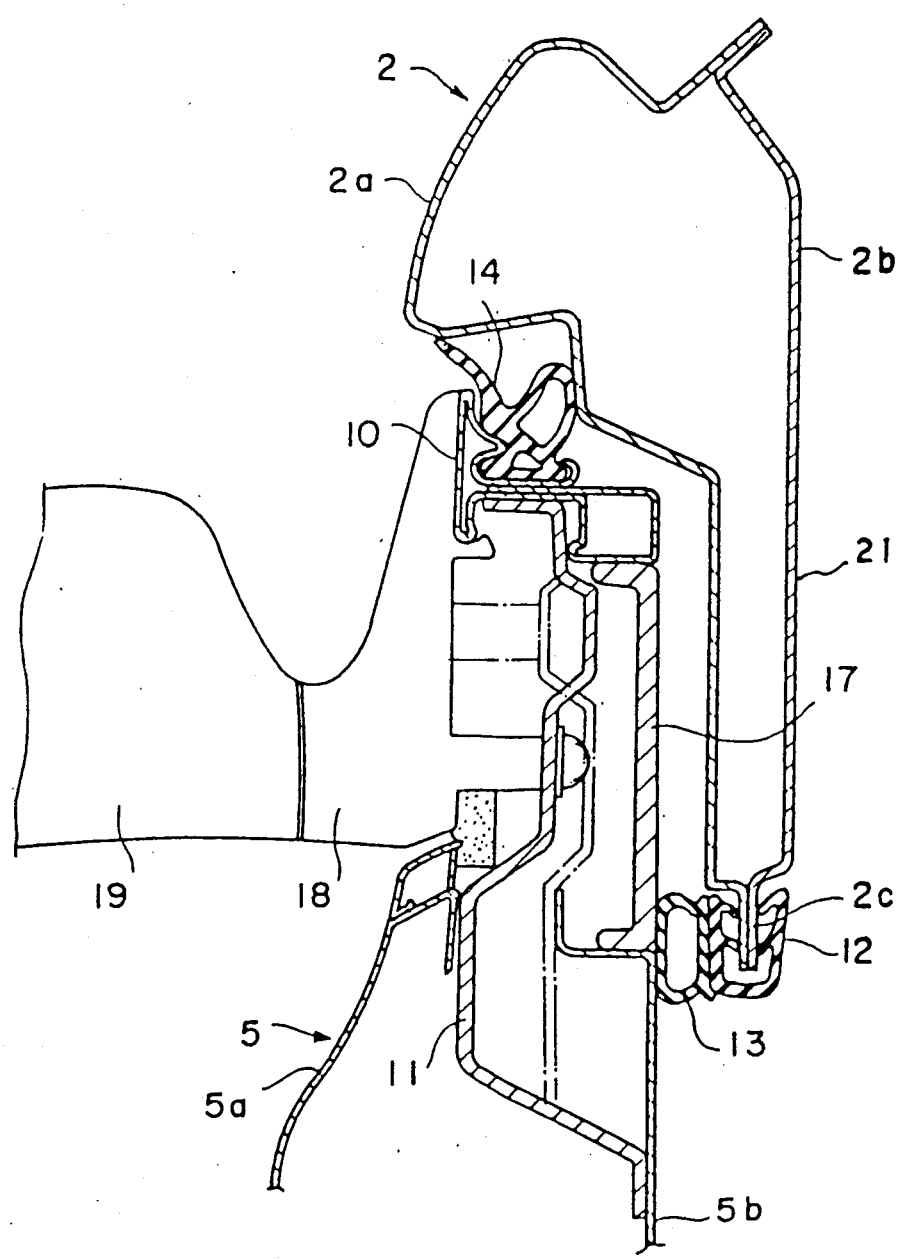
FIG. 6 is a sectional view taken along line VI—VI in FIG. 3.

At the location near the lower end of the corner bracket 11, since the reinforcement 21 of the front pillar 2 further extends toward the body opening, as shown in FIG. 6, the seal lip 13 is further spaced from the door sash 10 and makes contact with both the rear end of the garnish 17 and an inwardly facing surface of a front door inner panel 5b to seal the body opening.

In FIG. 6, reference numeral 5a designates a front door outer panel.

Figure 7:
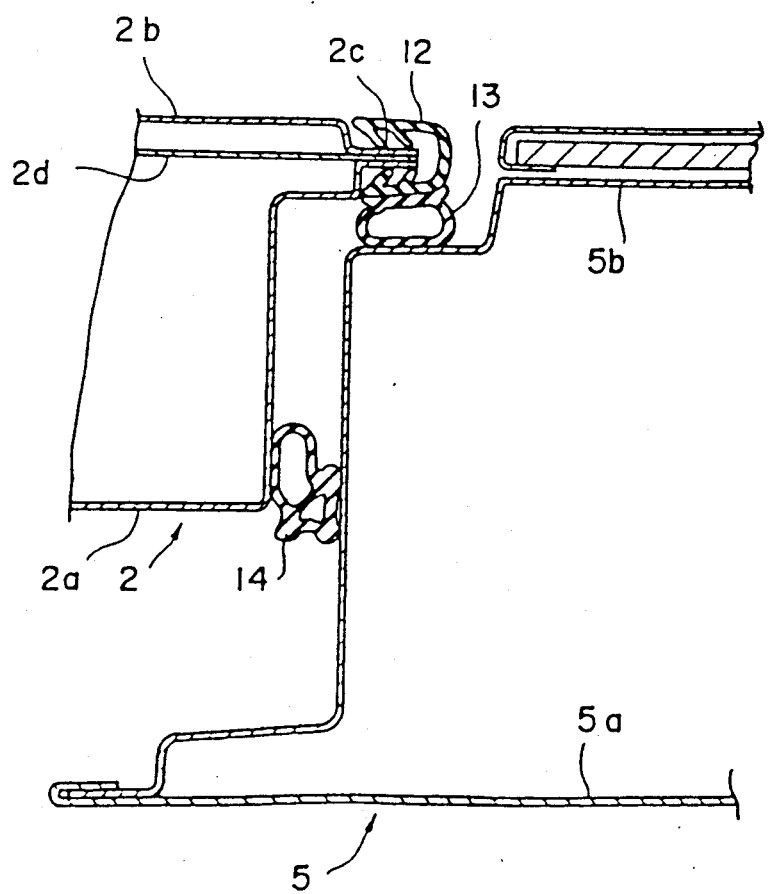
FIG. 7 is a sectional view taken along line VII—VII in FIG. 3.

As shown in FIG. 7, since the front pillar 2 has no reinforcement at the location considerably below the corner bracket 11, the seal lip 13 makes contact with an inwardly facing surface of a stepped portion formed near the front end of the front door inner panel 5b.

In the above-described sealing arrangement according to the present invention, the seal lip 13 is rearwardly spaced from the door sash 10 at a front upper portion of the front door 5. In this portion, the seal lip 13 sealingly engages with an inwardly facing surface of the trim member 17 when the front door 5 is closed. This fact can ensure the sealing for the body opening. Furthermore, the rigidity of the front pillar 2 can be raised by enlarging the reinforcement 21 of the front pillar 2. In addition, the provision of the seal lip 13 inwardly of the corner bracket 11 can contribute to the good appearance of the vehicle body.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. In an automotive vehicle body having a plurality of structural members defining an opening and a closure for the opening mounted on one of the plurality of structural members for swinging movement between closed and opened positions, a sealing arrangement for the closure comprises:

a corner bracket structure at a front upper portion of the closure, the closure further having a sash member above said corner bracket structure;

a reinforcement, said reinforcement being disposed on one of the plurality of structural members defining the opening, said one of the plurality of structural members being located at a front upper portion of the opening; and a continuous sealing means securely attached to the plurality of structural members and a lower edge of said reinforcement for, when the closure is in its closed position, abutting with an inwardly facing surface of said sash member of the closure at a location above said corner bracket structure and gradually departing from contact with said inwardly facing surface of said sash member in a rearward direction of the vehicle body at the location of said corner bracket structure.

2. The sealing arrangement of claim 1, wherein said corner bracket structure has a trim member decoratively trimming an inwardly facing surface of said corner bracket structure, said sealing means abutting said trim member when the closure is in its closed position.

3. The sealing arrangement of claim 2, wherein, at a lower end of said corner bracket structure, said sealing means contacts both a rear end of said trim member and an inwardly facing surface of the closure.

4. The sealing arrangement of claim 3, wherein said sealing means contacts an inwardly facing surface of a front end of the closure below said corner bracket structure.

5. The sealing arrangement of claim 1, wherein said reinforcement widens relative to said sash member as said reinforcement extends downwardly.

* * * * *